Patented Apr. 12, 1927.

1,624,546

UNITED STATES PATENT OFFICE.

ARTHUR W. DOX, OF WINDSOR, ONTARIO, CANADA, ASSIGNOR TO PARKE DAVIS & COMPANY, OF DETROIT, MICHIGAN, A CORPORATION OF MICHIGAN.

ETHYL-NORMAL-HEXYL-BARBITURIC ACID.

No Drawing.    Application filed December 15, 1924.   Serial No. 756,155.

My invention relates to the synthetic manufacture of a new compound of the barbituric acid series which exhibits hypnotic and sedative properties useful in the practice of medicine. This compound may be designated by the name ethyl-normal-hexyl-barbituric acid and represented by the following structural formula:

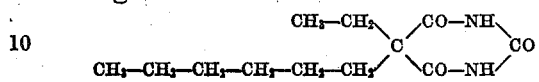

In the commercial preparation of this compound it is preferable to employ ethyl malonate as the material from which the new compound is synthetically obtained and I have found it advantageous to carry out the process in three separate steps. The first step consists in treating the ethyl malonate with sodium in alcoholic solution and then adding normal hexyl halide, thereby forming the hitherto unknown intermediate compound ethyl normal-hexyl-malonate. The second step results in the conversion of the intermediate product into another hitherto unknown intermediate compound ethyl ethyl-normal-hexyl-malonate, the latter being preferably obtained by the addition of ethyl bromide, while maintaining the solution at the temperature of a steam bath until the reaction is completed. The third step comprises the treatment of the product previously obtained under pressure with urea and sodium ethoxide in alcoholic solution. When this reaction is completed the final product, ethyl-normal-hexyl-barbituric acid is precipitated by the addition of a mineral acid.

In carrying out the first step of the process, the following procedure is used: 23 parts by weight of sodium are dissolved in 400 parts by volume of absolute alcohol and 160 parts by weight of ethyl malonate gradually added while the liquid is mechanically stirred. The solution is then warmed on a steam bath and 165 parts by weight of normal-hexyl-bromide added slowly through a dropping funnel. After four hours on the steam bath the mixture is neutral to litmus. The greater part of the alcohol is removed by distillation, and the residue consisting mainly of sodium bromide and ethyl-normal-hexyl-malonate is treated with water. The oily layer is separated and purified by distillation, yielding a colorless, oily liquid with a faint fruity odor, boiling at 268–270° C. at 749 mm. pressure.

The second step in the process consists in dissolving 23 parts by weight of sodium in 400 parts by volume of absolute alcohol and adding 244 parts by weight of ethyl-normal-hexyl-malonate with mechanical stirring. The solution is heated on a steam bath under a reflux condenser and 109 parts by weight of ethyl bromide slowly added. After 1½ hours the mixture is neutral to litmus. The alcohol is removed by distillation and the residue treated with water. Purification of the oily layer by distillation gives a colorless oil, ethyl ethyl-normal-hexyl-malonate, boiling at 280–282° C. at 755 mm. pressure.

The third and final step consists in dissolving 6.9 parts by weight of sodium in 100 parts by volume of absolute alcohol, adding 25 parts by weight of ethyl ethyl-normal-hexyl-malonate and 9 parts by weight of urea and heating the mixture in an autoclave for six hours at 102° C. The product is then evaporated and made distinctly acid with hydrochloric acid. An oil separates which solidifies almost instantly. This is washed on a filter with water and then with petroleum ether, and recrystallized from dilute alcohol.

Ethyl-normal-hexyl-barbituric acid melts at 126° C. It is soluble in alcohol, ether, benzene and caustic alkalies, and slightly soluble in water, but it is insoluble in petroleum ether. It has strong hypnotic properties which have the advantage of shorter duration and more prompt recovery than is the case with most of the lower homologs in the barbituric acid series.

While details of procedure, as outlined above, have been found to be satisfactory for the commercial preparation of this compound, my invention is not limited to the exact details except as expressed in the appended claim.

What I claim as my invention is:—

As a new product of manufacture, the compound which may be designated as ethyl-normal-hexyl-barbituric acid, said compound being a white crystalline solid having hypnotic properties and the following structure:

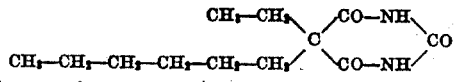

In testimony whereof I affix my signature.

ARTHUR W. DOX.